Patented Sept. 30, 1952

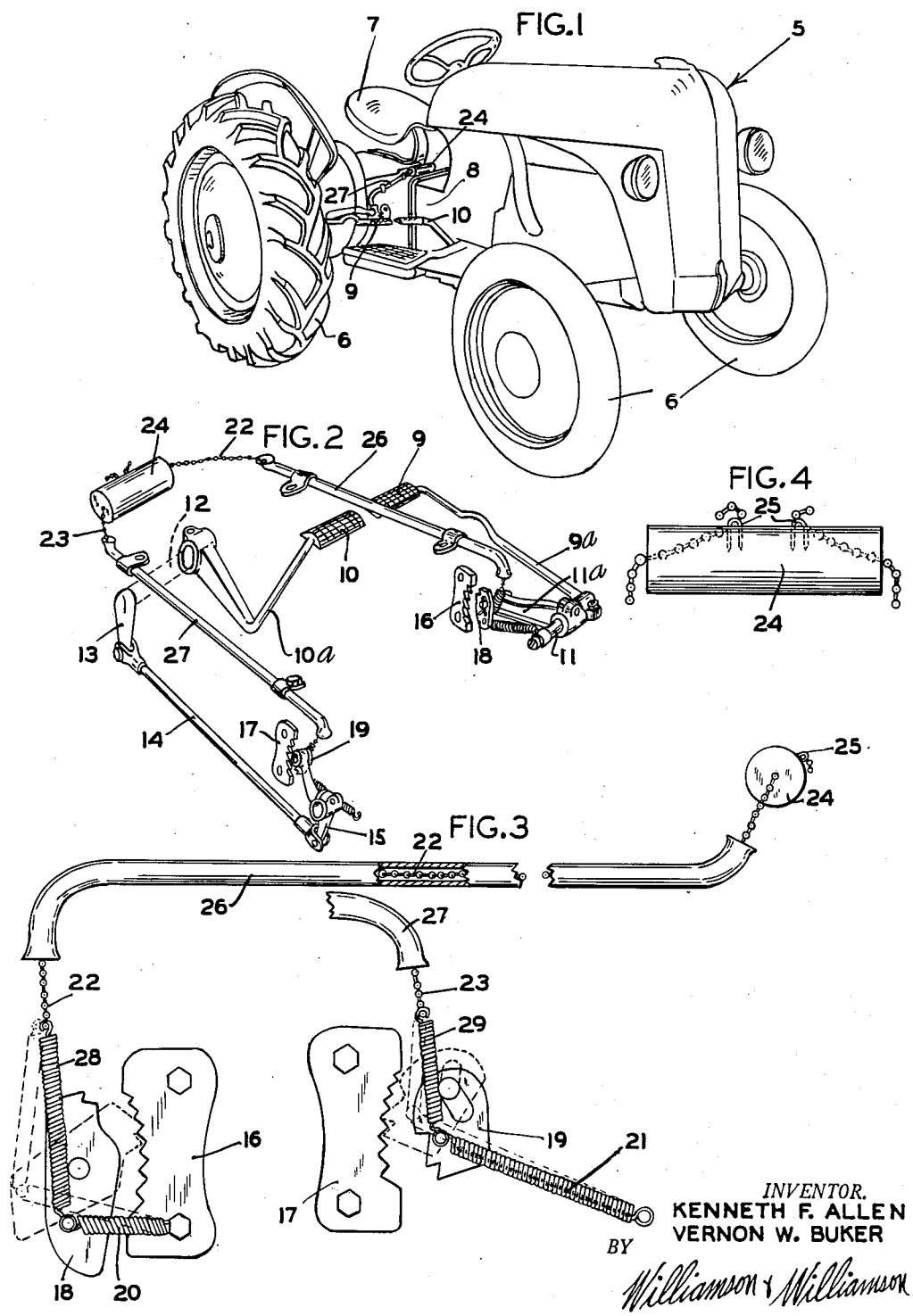

2,612,059

UNITED STATES PATENT OFFICE 2,612,059

CONTROL DEVICE FOR LOCKING TRACTOR BRAKES

Kenneth F. Allen and Vernon W. Buker, St. Cloud, Minn.

Application December 8, 1950, Serial No. 199,822

1 Claim. (Cl. 74—527)

This invention relates to a control device for facilitating locking of tractor brakes.

It has, in the past, been extremely difficult for the operator of a conventional tractor to lock his brakes. Conventional tractors have individual locking members, which are positioned on the sides of the tractor immediately behind the transmission casing. It is extremely difficult, if not impossible, to simultaneously lock both brakes or to lock either of the brakes individually.

It is an object of our invention to provide a control device adapted to be easily operated by the tractor operator, whereby either brake may be individually locked in applied position or both brakes simultaneously locked.

It is a more specific object of our invention to provide an attachment for conventional farm tractors or the like, by which the tractor operator may easily control the locking of the brakes either individually or together, and in which by a single control handle, within easy reach of the tractor operator, the brake locking dogs may be quickly and easily shifted into brake locking position.

It is still a further object to provide brake locking control attachments for farm tractors having a pair of flexible connector elements resiliently connected to the respective brake locking dogs and interconnecting the same with a single control handle for shifting the dogs into locking position against the force of a pair of resilient elements for normally urging the dogs into retracted brake releasing position.

These and other objects and advantages will more fully appear from the following description made in connection with the accompanying drawings wherein like reference characters refer to the same or similar parts throughout the several views and in which:

Fig. 1 is a perspective view of a conventional farm tractor showing our improved attachment for controlling the brake locks thereof.

Fig. 2 is a perspective view showing, as viewed from the upper rear portion of the tractor showing only the brake operating mechanism of the tractor illustrated in Fig. 1 with our improved control device connected therewith.

Fig. 3 is a diagrammatic view, showing in detail the operation of our brake locking control device as it is operatively connected to the brake locking dogs; and Fig. 4 is a front elevational view of the control handle showing the connection of the flexible connector elements.

As illustrated in the accompanying drawings, there is shown a conventional farm tractor designated by the numeral 5, and having the wheels 6, tractor seat 7, transmission housing 8, right brake control pedal 9 and left brake control pedal 10. The pedals 9 and 10 are respectively fixed on actuating levers 9a and 10a, which in turn, are secured to rock shafts 11 and 12. A rocker arm 11a is fixed to rock shaft 11 and the rock shaft 12 extends across from one side of the tractor to the other, and has a rocker arm 13 fixed thereto. A line 14 pivotally interconnects a bell crank 15 and rocker arm 13. The connections between the rock shaft 11 and the right hand brake and between the bell crank 15 and the left hand brake are not shown but are of conventional design, as is the previously described mechanism. A pair of rigidly mounted toothed locking elements 16 and 17 respectively receive the pivoted locking dogs 18 and 19, which are respectively mounted on the free ends of the rocker arm 11a and bell crank 15 to be shifted therewith when the respective pedals 9 and 10 are depressed. An elongated slot is formed in locking dog 19 and receives a pivot pin therethrough to interconnect bell crank 15 therewith. On conventional tractors, these dogs 18 and 19 must be swung by hand into the respective teeth of the fixed locking elements 16 and 17. Whenever the brake pedal is depressed, the rocker arm 11a is shifted downwardly and the locking dog 18 is swung inwardly to lock said arm into downwardly swung brake applying position. When the brake pedal 10 for the left hand brake of tractor 5, as viewed from the rear, is depressed, the bell crank 15 is swung in a clockwise direction to raise the dog 19 and in order to lock the left hand brake in applied position, the dog 19 must be shifted inwardly at the bottom to engage the teeth of fixed locking member 17 and hold the bell crank against counterclockwise shifting movement, as viewed in Fig. 2.

Our attachment device is connected to the locking dogs 18 and 19 for controlling the swinging movement thereof into locking position. A pair of springs 20 and 21 respectively hold the dogs 18 and 19 in retracted position by being respectively connected therewith in the form shown at a point in spaced relation below the respective pivot pins of said dogs. A pair of flexible interconnection elements, such as the chains 22 and 23, respectively interconnect the locking dogs 18 and 19 with a control handle 24, to which the upper ends of the chains are fixed, as by the anchoring staples 25. Suitable conduits 26 and 27 are provided for carrying the respective chains 22 and 23 from the dogs 18 and 19 to the handle 24. The handle is positioned in the form shown, adjacent the forward portion of the seat 7 of the tractor within easy reach of the operator, who by merely pulling upwardly on the handle, will swing the two dogs 18 and 19 into their locking positions to lock brakes in applied position. It should be noted that by tilting the handle 24, either to the left or to the right, only one of the dogs will be shifted when the handle is pulled upwardly in tilted relation, the other cable remaining loose during this operation. A pair of relatively high tensioned spring elements 28, and 29 respectively interconnect the lower ends of chains 22 and 23 to the lower portions of the respective locking dogs 18 and 19 to cushion the impact of sudden jerks on the respective chains.

It will be seen that we have provided a relatively simple, yet highly efficient attachment for conventional tractors, which greatly facilitates control of the brake locking dogs and permits the same to be easily shifted into locking position by the operator, either simultaneously or individually, without moving from his driving position in the seat of the tractor. The resilient retraction springs 20 and 21 positively urge the dogs 18 and 19 into retracted position to insure releasing of the brakes upon slight downward pressure on the pedals 9 and 10, and then releasing said pedal pressure, in the conventional manner.

It will, of course, be understood that various changes may be made in the form, details, arrangements, and proportions of the parts without departing from the scope of my invention.

What we claim is:

An attachment for farm tractors and the like for facilitating individual control of the brake locking mechanism of a tractor, said attachment comprising a pair of elongated flexible actuating elements, an operating handle securely connected to one end of each of said elements for interconnecting the same to form a continuous elongated flexible unit with a rigid gripping handle fixed thereto at the medial portion thereof, the other ends of said elements being adapted to be respectively connected with the two pivoted brake locking dogs, and a pair of elongated guiding tubes adapted to be mounted in fixed relation to a tractor and respectively receiving the two flexible elements in sliding relation therethrough to form the sole means of positioning the two interconnected end portions of said flexible elements and for directing the application of tension thereon to the position for swinging the locking dogs into operative position, said handle permitting simultaneous or selective individual tensioning of said two flexible elements whereby said two dogs may be simultaneously swung into locking position or may be individually shifted into locking position.

KENNETH F. ALLEN.
VERNON W. BUKER.

REFERENCES CITED

The following references are of record in the file of this patent:

UNITED STATES PATENTS

| Number | Name | Date |
|---|---|---|
| 543,754 | Semple | July 30, 1895 |
| 1,154,703 | Lee | Sept. 28, 1915 |
| 1,224,826 | Wiser | May 1, 1917 |
| 1,408,416 | Smith | Feb. 28, 1922 |
| 2,443,331 | Stewart | June 15, 1948 |